Figure 1:
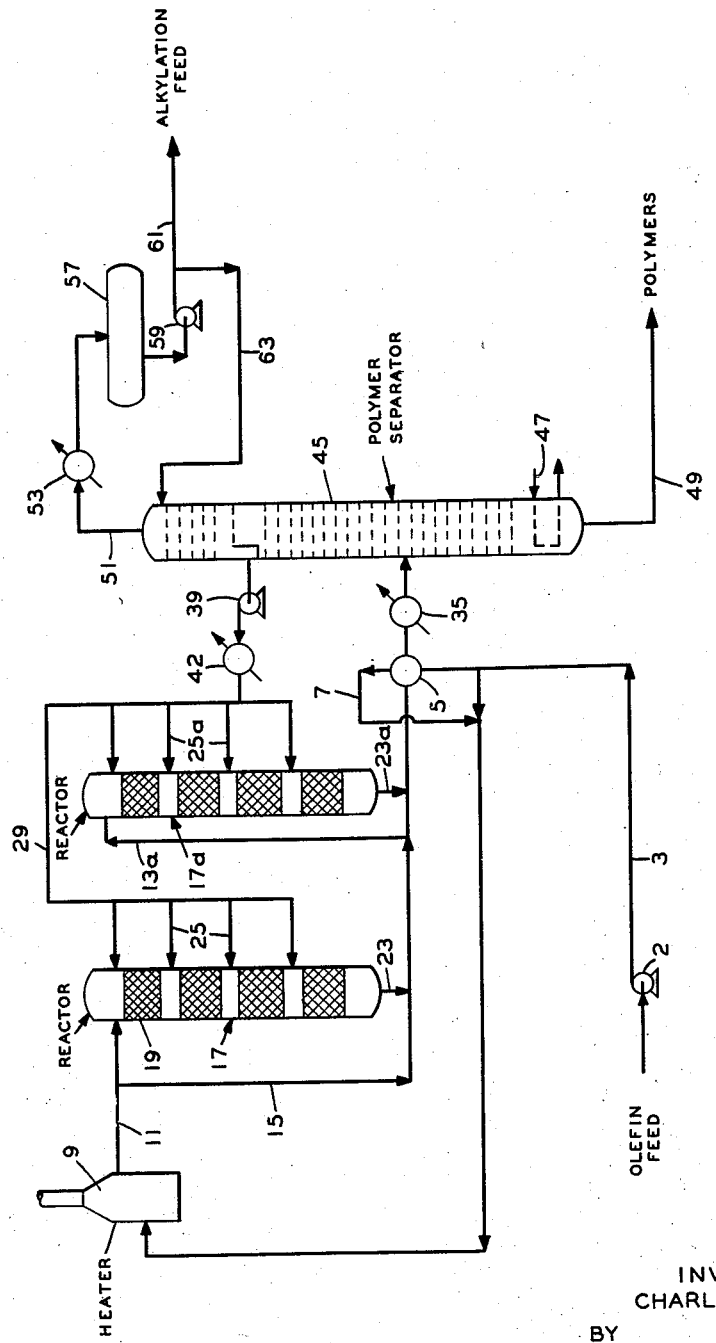

INVENTOR
CHARLES C. KING
BY
*G. H. Palmer*
ATTORNEY

INVENTOR
CHARLES C. KING
BY
G. H. Palmer
ATTORNEY

United States Patent Office 2,829,182
Patented Apr. 1, 1958

2,829,182

PURIFICATION AND ALKYLATION OF HYDROCARBONS

Charles C. King, Short Hills, N. J., assignor to The M. W. Kellogg Company, Jersey City, N. J., a corporation of New Jersey Application June 28, 1954, Serial No. 439,646

5 Claims. (Cl. 260—683.15)

This invention relates to an alkylation process. More particularly, it relates to a process for the alkylation of isoparaffins, such as isobutane, with olefins, such as butylene in the presence of an acid catalyst to produce hydrocarbon compounds boiling in the gasoline range. Still more particularly, it relates to a method of preparing an improved alkylation feed stock.

In the commercial alkylation of low-boiling isoparaffins with olefins to form alkylates of high octane quality, it is customary to utilize feed stocks varying widely in composition and containing a large variety of saturated and unsaturated compounds. For example, either cracked or straight run refinery gases, which are a prime source of alkylation feed stocks, may include paraffins containing from 1 to 6 carbon atoms, isoparaffins including isobutane, isopentane and others of higher molecular weight and numerous low boiling olefins and their isomers. In addition organic sulfur containing compounds, diolefins, acetylene and acetylene homologues, aromatic and cyclic compounds are usually present in varying amounts. While many of these compounds are not harmful, some of them are undesirable because of their unreactivity in the alkylation reaction and because it is necessary to separate them from the reaction products. Still others have a detrimetal effect on the alkylate quality or on the alkylation catalyst, or both. Where economically possible it is desirable to remove the latter compounds, either from the alkylation feed or from the alkylate product. For example, it is preferable to remove sulfur compounds prior to the alkylation reaction to prevent equipment corrosion and other undesirable effects. Other compounds in this latter group normally present in alkylation feed stocks are diolefins and acetylene. These materials are undesirable because they polymerize readily, forming high-boiling polymers which contaminate the alkylation catalyst and which, when retained in the alkylate, reduce its quality. It is with the removal of these polymer forming compounds that this invention is concerned.

It is an object of this invention to provide an improved process for alkylating isoparaffins with olefins.

Another object of this invention is to provide a new and useful method for preparing an improved alkylation feed stock.

Still another object of this invention is to increase alkylate quality and decrease catalyst consumption in the alkylation of isoparaffins with olefins.

These and other objects of this invention will become more apparent from the following detailed discussion and description.

In one aspect, this invention comprises a method of feed preparation in which an alkylation feed stock is subjected to a mild polymerization treatment and the resulting product is removed in a separation zone. In another aspect this invention comprises a process in which an improved alkylate is prepared by polymerizing highly unsaturated compounds in an alkylation feed stock, removing the polymers in a separation zone and reacting the remaining hydrocarbons in the presence of an acid catalyst to form a high octane material boiling in the gasoline range.

In the method of this invention certain undesirable highly unsaturated compounds normally contained in low-boiling alkylation feed stocks are selectively polymerized to form higher-boiling polymers which are readily removed from the hydrocarbon mixture. The term "polymers" or "higher-boiling polymers" as used herein, is intended to include only the polymers within this group. Any low-boiling polymers formed in the process, for example from monolefins, such as diisobutylene from isobutylene, are retained in the alkylation feed stock.

Catalysts which are of value in the promotion and acceleratio nof alkylation reactions tend to promote polymerization of the unsaturated components in the alkylation feed stock. Further, the greater the degree of unsaturation, the more likelihood there is of polymerization reactions taking place. By conducting the alkylation reactions under controlled conditions of temperature, pressure and reactant ratios and by providing for intimate contact of the reactants, it is possible to restrict the amount of olefins polymerized. Even under these conditions, however, more highly unsaturated hydrocarbons such as diolefins, acetylene and acetylene homologues are easily polymerized with a resulting contamination of the alkylation catalyst and alkylate product. This contamination problem is particularly serious in alkylation reactions carried out in the presence of sulfuric acid. In order to properly utilize sulfuric acid as an alkylation catalyst, it is necessary to maintain its strength at a high level, above 80% and preferably above 90%. Heavy polymers formed during the alkylation reaction tend to concentrate in the acid thereby diluting it below its effective concentration. Only a small amount of contamination can be allowed before it becomes necessary to discard the diluted or spent acid or process it through an expensive reconcentration process.

It has been found that these objectionable results can be avoided by subjecting the alkylate feed to a mild selective polymerization treatment under conditions of low temperature, low pressure and high space velocity. The temperature range utilized is between about 50° F. and about 600° F., preferably between about 200° and about 450° F. Since only a mild degree of polymerization or selective polymerization of highly unsaturated materials is desired, the reaction is carried out at a pressure sufficient only to condense the reaction products with ordinary cooling water, that is, between about 10 and about 250 p. s. i. g., preferably between about 50 and about 150 p. s. i. g. For the same reason, the space velocity is maintained at a high value, between about 0.1 and about 10.0 gallons of hydrocarbon per hour per pound of catalyst or, more usually, between about 0.5 and about 3.0 gallons of hydrocarbon per hour per pound of catalyst. Under these conditions, selective polymerization of diolefins and more highly unsaturated compounds to higher-boiling polymers is accomplished and these compounds are removed from the polymerization effluent by distillation or some other conventional method of separation.

Although the polymerization of diolefins and acetylenes is much more rapid under these conditions than the polymerizaiton of monoolefins, it is difficult, if not impossible, to prevent the polymerization of some low-boiling monoolefins with this method of feed pretreatment. Due to the mildness of the polymerization treatment, however, the polymers formed are also low-boiling and are satisfactory as reactants in the alkylation process. For this reason, the rerunning or distillation step, wherein the diolefin and acetylene polymers are separated from the remainder of the alkylation feed stock, is carried out in such a manner that any polymers produced from monoolefins are removed with the alkylation feed.

The selective polymerization treatment of the alkylation feed preliminary to the alkylation reaction may be carried out in the presence of any solid polymerization catalyst well-known in the prior art. For example, the pyrophosphates of copper, mercury, zinc, magnesium, iron, aluminum and cobalt may be used. Another catalyst also frequently employed is the so-called solid acid type comprising phosphoric acid deposited on a solid carrier and calcined.

This invention is particularly applicable in the alkylation of low-boiling isoparaffins with olefins containing a similar number of carbon atoms. The isoparaffins used in this process may be isobutane, isopentane, isohexane, etc. or mixtures thereof. Olefins more often reacted are propylenes, butylenes, pentylenes, their isomers or mixtures thereof. It is within the scope of this invention to utilize any proportions of the above as feed stocks and also mixtures of isoparaffins and olefins with or without the presence of normal paraffins. In addition, diolefins such as propadiene, butadiene, pentadiene and isomers thereof are present along with more highly unsaturated compounds such as acetylene and lower-boiling homologues thereof.

Although as mentioned before, this invention is particularly beneficial when a sulfuric acid catalyst is used, other well known alkylation catalysts such as hydrofluoric acid, metal halides, phosphoric acid, phosphorus pentoxide, etc., are also used within the scope of the invention.

Of particular commercial interest in the alkylation field is the reaction of isobutane with butylene in the presence of a suitable catalyst to form valuable gasoline components. For purposes of providing a fuller understanding of the invention and because of its widespread application the subsequent discussion will be directed to this process, however, this is not to be construed as restricting the scope of the invention.

The alkylation of isobutane with butylene in the presence of sulfuric acid is preferably conducted in several stages and at a temperature between about 0° F. and about 100° F. The pressure in the reaction zone is maintained at a level sufficient to keep the reactants in a liquid state, usually between about atmospheric and about 100 p. s. i. g. The ratio of isobutane to olefin feed in the reaction zone is preferably maintained between about 2.0 and about 20.0.

In a typical application of this invention an alkylation feed stock comprising a mixture of propane, butane, isobutane, butylenes, low-boiling diolefins and acetylene is introduced into a contact zone containing a polymerization catalyst where the highly unsaturated diolefins and acetylene are polymerized to higher-boiling polymers. The effluent from the polymerization zone is then passed to a distillation zone where the higher-boiling polymers are separated from the remainder of the alkylation feed.

In the alkylation step isobutane and sulfuric acid are introduced into an alkylation contact zone and are violently agitated to form an emulsion, this being the preferred method of insuring intimate contact between the acid catalyst and the hydrocarbon to be alkylated. The major portion of the isobutane feed is provided by a recycle stream obtained from a subsequent distillation step. Any additional quantity of isobutane required, for example, that amount needed to start up the unit, is usually supplied from an independent source. The mixing and agitation required in the contact zone may be provided in a number of ways; however, usually a conventional mixer or pump provides means for creating and moving the emulsion at high velocity and also for circulating the emulsion in the contact zone. The reaction may be carried out in one stage, although, more usually, several stages in series are provided, with a portion of the olefin reactant, in this case the alkylation feed from the polymerization zone, being admitted to each stage and the isobutane-sulfuric acid emulsion being passed along with the reaction products from each stage through successive stages, each containing a means for circulating emulsion and thence into a settling zone where the contaminated acid catalyst containing polymers and other impurities is separated from the alkylate and unreacted isobutane. A portion of the contaminated acid is recycled to the contactor and the remainder is discarded or is processed to remove contaminants and reused. The alkylate and unreacted isobutane are further processed to separate the alkylate, and the isobutane is recycled to the alkylation contacting zone. As a result of this invention, the amount of polymers in the contaminated acid catalyst is reduced, thus reducing the amount of acid to be processed for reuse. Not all of the polymers formed in the alkylation contactor are retained in the sulfuric acid, part of them remain in the alkylate and have the effect of reducing its quality. Thus, by removing the polymer forming materials prior to the alkylation reaction, alkylate quality is also improved.

Figure 2:
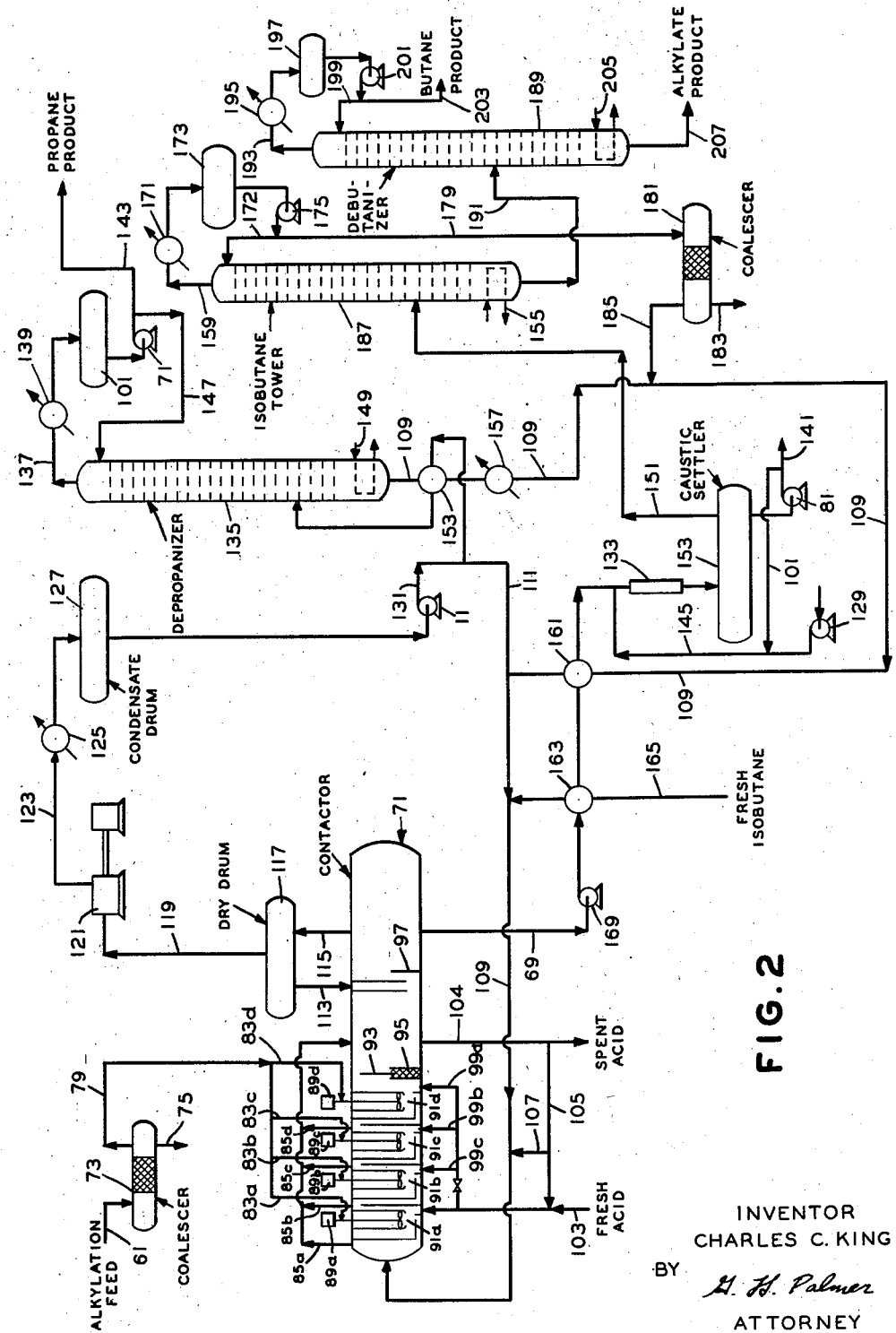

In order to more clearly illustrate the invention and to provide a better understanding thereof reference is had to a specific embodiment thereof presented in the attached drawings, of which:

Figure 1 is a diagrammatic illustration of polymerization reactors, a polymer separator and associated heat exchange equipment drawn in elevation and in cross-section and, Figure 2 is a similar illustration of an alkylation contactor, depropanizer, isobutane tower, debutanizer and associated heat exchange equipment.

Referring to Figure 1, a hydrocarbon oil comprising a mixture of propane, butane, isobutane and butylenes and containing about 0.5 volume percent of highly unsaturated materials comprising a mixture of diolefins, acetylene and acetylene homologues is transferred by means of pump 2 through conduit 3 to a fired heater 9 where it is preheated to a temperature of about 350° F. A portion of the feed preheat is obtained by indirect heat exchange with the effluent from reactors 17 and 17A in a conventional heat exchanger 5 with the olefin feed then passing through conduit 7 to heater 9. This not only reduces the duty of heater 9 but also partially cools the effluent from the reactors. The hot feed leaves heater 9 through conduit 11 and enters the top of reactor 17. Reactor 17 is a vertical, cylindrical vessel containing a number of separated beds of granular copper pyrophosphate catalyst. Two reactors 17 and 17A are pictured in this illustration and they may be used either simultaneously or alternately. It is customary in the polymerization of olefins for the copper pyrophosphate catalyst to become inactive after a period of sustained use. Continuous operation is normally provided by switching the reactants to a reactor containing active catalyst while the operation of removing spent catalyst and replacing it with new catalyst is carried out in the other reactor. In view of the mild degree of polymerization contemplated within the scope of this invention, however, it is possible that renewal of catalyst between unit turnarounds will not be necessary and that one reactor will suffice.

Assuming reactor 17 to be in use, the hot feed enters the top portion of the reactor and passes downward through the successive beds 19 of catalyst leaving the reactor through conduit 23 at a temperature of about 365° F. During the passage through the reactor the highly unsaturated diolefins and acetylenes are converted to higher-boiling polymers. The reaction products pass through heat exchanger 5 giving up heat to fresh feed and then through a conventional water cooler 35 where an additional quantity of heat is removed in order to control the temperature of this stream as it enters the polymer separator 45. Within this separator, which is a conventional fractionation tower, the higher-boiling polymers are fractionated from the hydrocarbon mixture and are removed from the bottom of the separator through conduit 49. To provide for retention of the undesirable polymers in the tower bottoms the temperature and pressure are closely controlled. In this specific embodiment the top tower temperature and pressure are maintained at about 150° F. and 70 p. s. i. g. The heat requirements for this tower are supplied by a conventional reboiler 47 or from another conventional heat source. The hydrocarbons remaining after the removal of the higher-boiling polymers, including any olefins polymerized in the reactor, are removed overhead through conduit 51 and passed through a conventional condenser 53 and into an accumulator 57. A portion of the condensed overhead is transferred by pump 59 through conduit 63 to the top of the polymer separator as reflux. The remaining portion of the condensed overhead liquid comprises the alkylation feed and it is passed through conduit 61 to the alkylation unit.

Although removal of the polymers from the processed alkylation feed is accomplished by distillation in this specific illustration other separation methods are also within the scope of this invention. For example, separation methods based on molecular weight, selective absorption with an immiscible solvent, etc., may be used.

The reactions which take place in the polymerization reactor 17 are highly exothermic. In order to remove the heat of reaction a cooling fluid is admitted to the reactor through a plurality of lines, one of which terminates above each bed of catalyst 19. By varying the flow of cooling medium through these lines the temperature of each bed is closely controlled, preferably the same as the reactor outlet temperature. In this specific illustration the cooling medium is supplied by recycle from the upper portion of the polymer separator 45. Liqiud is withdrawn from this portion of the separator because the material within the tower at this point contains practically no polymers and is at a fairly low temperature, about 170° F. The recycle cooling medium is removed from the separator through conduit 29 by means of pump 39, passed through a conventional water cooler 42 where the temperature is further reduced and is admitted to reactor 17 through conduits 25. The amount of coolant admitted to each catalyst bed is controlled to give a substantially uniform temperature throughout the reactor.

It is not intended that the polymerization treatment be restricted in scope to this specific application. Other types of catalyst arrangements, flow schemes, methods of removing reaction heat, etc., well-known to those skilled in the art are also contemplated for use with similar results within the scope of this invention.

After removal of the diolefin and acetylene polymers the alkylation feed is ready for further processing. Referring to Figure 2 the alkylation reactions are carried out in a cylindrical elongated closed contacting vessel 71. The interior of approximately one-half of the contactor is divided into a number of separate reaction stages or sections 91a, b, c and d by transverse baffles so arranged that liquid entering the end of the contactor passes from an inlet chamber 91 upward through the first section 91a, over a baffle down to the bottom of the second 91b, then upward through the second section over a second baffle and in a similar manner through the third and fourth sections 91c and d. Each section contains a mixer, 89a, b, c and d, respectively, in this specific illustration, centrifugal submersible pumps disposed vertically with the drivers located outside and above the contactor and the impellors located in the lower portion of each reaction section. Each pump is so constructed that material entering the suction is forced upward within the pump casing and then downward and out through perforations in the casing into the upper part of the corresponding reaction section. The pump capacities are such that the quantity of material circulated through each pump is about twenty times greater than the total liquid flow entering the section within which the pump is located.

The alkylation reactants and catalyst enter the contactor 71 at three different points. The treated alkylation feed, now comprising a mixture of propane, butane, isobutane and butylenes is passed through conduit 61 into a coalescer vessel 73 containing excelsior or a similar material for the removal of undissolved water. The water is removed from the coalescer through conduit 75 and the alkylation feed passes overhead through conduit 79 and enters pumps 89a, b, c and d through conduits 83a, b, c and d, respectively passes downward through a hollow sleeve surrounding each pump shaft and is admitted to the liquid stream flowing through each pump, downstream of the pump impellers. A mixture of propane, butane, and isobutane made up of a recycle stream from the isobutane tower 187, fresh isobutane from conduit 165 and compressor effluent from condensate drums 127 are admitted to the inlet chamber 91 of the contactor. The acid catalyst, comprising a mixture of fresh acid and contaminated acid in an amount to provide an external acid to olefin ratio of about 4 pounds of acid per pound of olefin, is admitted to the bottom of the first reaction section 91a through conduit 103. As illustrated, fresh acid alone may be used rather than a mixture of fresh and contaminated acid and acid may be introduced not only into the bottom of the first section but may also be admitted to the succeeding sections. The isobutane passes from the inlet chamber 91 also into the first section 91a, is combined with the acid and the mixture enters the suction of pump 89a where it is picked up, emulsified and directed within the pump casing at a high velocity. The alkylation feed from conduit 83a is admitted to the emulsion downstream of the pump impellor and the alkylation reaction proceeds immediately and is substantially completed before the reactants leave the pump casing. The capacity of pump 89a and the other pumps is sufficiently great to assure a circulation rate several times as great as the flow of alkylation feed, isobutane and acid into section 91a. Thus unreacted isobutane is circulated, along with the acid catalyst and a portion of the alkylation product, through the pump a number of times before it passes into the next section where another portion is reacted with fresh alkylation feed. The same procedure is repeated in sections 91c and d. By this method of contacting the reactants and catalyst it is possible to provide an internal ratio of isobutane to butylenes, of about 400 to 1 with an external ratio of only about 20 to 1.

The mixture of isobutane, alkylate and acid leaving the last section passes through an emulsion breaking zone 95 formed by parallel transverse baffles and containing a conventional inert packing material. All of the effluent from the last section is forced to flow through this zone by a deflector baffle 93 extending above the liquid level within the contactor and downward within the emulsion breaking zone. Subsequent to this zone the acid separates from the hydrocarbon oil and is contained in a settling zone enclosed by baffle 97 over which alkylate and unreacted isobutane flow into the remainder of the contactor. The contaminated acid containing polymers and other impurities passes from the contactor 71 through conduit 104. A portion of this acid is recycled to the contactor either with fresh acid through conduit 105 or with the recycle isobutane stream through conduit 107. The remainder of the acid is discarded or is processed and reconcentrated for use again in the alkylation reaction.

The alkylation contactor 71 is maintained at a temperature of about 35° F. and at a pressure of about 3.5 p. s. i. g. The alkylation reaction is highly exothermic and it is necessary to provide a method of cooling the contactor to remove the heat of reaction and the sensible heat in the feed streams and thereby maintain the reaction sections at this low temperature. In this specific illustration, the cooling is accomplished by autorefrigeration of the reactants and reaction products. In carrying out this process, vapors are withdrawn from the contactor through conduit 115 into a dry drum 117. Any materials settling in the dry drum are returned to the contactor settling zone beneath the acid level through conduit 113. The dry gas enters the suction of compressor 121 through conduit 119, is compressed, discharged through conduit 123, condensed in a conventional water cooler 125 and passed to a condensate drum 127. The condensate comprises a mixture of propane, butane and isobutane. It is withdrawn from the condensate drum and divided into two parts, with a portion being sent to the depropanizer 135 and the remainder being returned to the contactor 71 with the fresh isobutane and isobutane recycle. It is desirable to proportion the condensed compressor effluent stream so as to maintain a controlled concentration of light materials in the contactor. By this means it is possible to obtain the desired contactor temperature with a reasonable compressor suction pressure.

The isobutane recycle stream enters the contactor as liquid and at a higher temperature and pressure than that maintained within the contactor, i. e., about 50° F. and about 20 p. s. i. g. As a result a portion of this stream flashes in the entrance chamber 91. To prevent a mixture of vapor and liquid from passing into the suction of pump 89a an outlet for this gaseous material is provided through conduit 85a. A similar situation prevails in each of the reaction sections. In order to remove the reaction heat from each section it is necessary that a further amount of light material be vaporized therein. This material is supplied primarily in the alkylation feed from conduits 83a, b, c and d, which feed is also introduced at a temperature and pressure, about 50° F. and about 25 p. s. i. g., substantially higher than those maintained in the contactor. The vapor so formed is removed from the contactor through conduits 85a, b, c and d, is combined with the vapor from conduit 85a, passes into the upper portion of the contactor downstream of the last reaction section and is withdrawn from the contactor through conduit 115. By this method of operation it is possible to maintain a relatively constant temperature throughout the contactor 71.

The condensed compresser effluent from condensate drum 127 passes through pump 11 and is discharged through conduit 131 with a portion being separated through conduit 111 and joining the isobutane recycle through conduit 109 as previously described and the remainder passing through a heat exchanger 153 countercurrent to the depropanizer bottoms and then into the depropanizer 135. Propane is taken overhead from the depropanizer through conduit 137, condensed in a conventional condenser 139 and discharged into accumulator 101. Accumulator liquid is then discharged through conduit 109 with a portion being sent to the depropanizer as reflux and the remainder leaving the unit through conduit 143 as propane product. Heat is supplied to the depropanizer by a conventional reboiler 149 or other conventional heat source. The bottoms comprising primarily isobutane with some butane pass from the bottom of the depropanizer through conduit 109, give up a portion of their heat in exchanger 153 to the depropanizer feed and pass through a conventional water cooler 157 where the temperature is lowered still further. The cool isobutane is exchanged still again in exchanger 161 with cold effluent from the contactor 71, then is combined with fresh isobutane from conduit 165 which is also exchanged with contactor effluent in exchanger 163 and the combined isobutane stream is admitted to the reactor as previously described.

The alkylation products and unreacted alkylation feed, after separation from the spent acid in the contactor 71, pass through conduit 69, pump 169 and exchangers 163 and 161 previously mentioned. The warmer hydrocarbon mixture is combined with caustic discharged from pump 129 through conduit 145 and the combined stream passes through a mixer 133 into a caustic settler 153. Neutralized caustic is removed from the settler by pump 81, a portion being recycled to the mixer 133 through conduit 101 and the remainder being discharged from the unit through conduit 141. The acid-free contactor effluent is passed through conduit 151 into the isobutane tower 187 from which isobutane is removed overhead through conduit 159, condensed in condenser 171 and collected in accumulator 173. A portion of the condensed material is returned through pump 175 and conduit 177 to the isobutane tower as reflux. The remainder is discharged through conduit 179, passes through a water coalescer 181 and is combined through conduit 185 with the depropanizer bottoms. Water separated from this stream is removed from the coalescer through conduit 183. The heat required to vaporize the isobutane in tower 187 is supplied by conventional reboiler 155. The bottoms from the isobutane tower, comprising a mixture of butane and alkylate, pass through conduit 191 to a debutanizer 189 also heated by a conventional reboiler 205. Butane vapor is removed overhead through conduit 193, is condensed in condenser 195 and passes into accumulator 197. Debutanizer recycle is provided from accumulator liquid discharged from pump 201 through conduit 199. The remainder of the condensed overhead is discharged through conduit 203 as butane product. The debutanizer bottoms comprising alkylate leave the debutanizer through conduit 207 for further processing and treatment (not shown).

It has been necessary in the past to fractionate the alkylate yield into a light and a heavy alkylate, thereby concentrating the lower quality and higher-boiling materials, primarily polymers, into one fraction. Of necessity a portion of the more desirable gasoline components are retained in heavier fractions. The method of this invention, by decreasing the polymers which must be removed from the total alkylate, correspondingly decreases the valuable components removed with them, thus providing an increased yield of light alkylate.

Similarly, in the past, the sulfuric acid alkylation process has suffered an economic disadvantage because of the inherent large consumption of catalyst. The present invention decreases catalyst consumption and in doing so reduces the economic advantages of other processes over the sulfuric acid process.

Having described the invention by reference to a specific application thereto it should be understood that no undue limitations should be imposed by reason thereof, but that the scope of the invention is defined by the appended claims.

I claim:

1. A method for treating an alkylatable hydrocarbon containing polymer forming contaminants selected from the group consisting of diolefins, acetylene, acetylene homologs and mixtures thereof, which comprises contacting said hydrocarbon with a solid polymerization catalyst in a conversion zone at a temperature between about 200° F. and about 450° F., a pressure between about 10 p. s. i. g. and about 250 p. s. i. g., to convert the contaminants to higher boiling polymers, removing products of reaction from said conversion zone, cooling said reaction products, passing said cooled products to a separation zone to recover polymer contaminants from the lower portion thereof, an intermediate fraction free of polymer contaminants, and a purified alkylatable hydrocarbon from the upper portion, cooling said intermediate fraction, passing said cooled fraction to said conversion zone to control the temperature thereof within the desired limits and passing said purified alkylatable hydrocarbon to an alkylation process.

2. A method of treating a low-boiling hydrocarbon for use in an alkylation reaction, which contains at least one polymer forming contaminant selected from the group consisting of diolefins, acetylene, acetylene homologs and mixtures thereof, which comprises contacting in a polymerizing zone said hydrocarbon with a solid polymerization catalyst at a temperature between about 200° F. and about 450° F., a pressure between about 50 p. s. i. g. and about 150 p. s. i. g., to convert the contaminants to higher boiling polymers, recovering product effluent from said polymerization zone, cooling said product effluent, passing said cooled product effluent to a fractionation zone, withdrawing polymer contaminant product from the lower portion of said fractionation zone, recovering purified alkylatable hydrocarbons from the upper portion of said fractionation zone, withdrawing a fraction free of polymer contaminants from an intermediate portion of said fractionation zone, cooling said withdrawn intermediate fraction and passing said cooled polymer free intermediate fraction to said polymerization zone to control the reaction temperature thereof.

3. A method for purifying an alkylatable hydrocarbon containing polymerizable contaminants selected from the group consisting of diolefins, acetylene, acetylene homologs and mixtures thereof, which comprises passing said alkylatable hydrocarbon into contact with a solid polymerization catalyst under conditions to polymerize said contaminants, cooling the reaction products and passing the same to a fractionation zone, withdrawing polymer contaminants from the lower portion of said fractionation zone, withdrawing an intermediate fraction at a temperature of about 170° F. free of polymer contaminants from said fractionation zone, further cooling said intermediate fraction, passing said cooled fraction to said polymerization reaction to control the temperature thereof, recovering purified alkylatable hydrocarbon from the upper portion of said fractionation zone and subjecting the same to alkylation conditions.

4. A method for treating an alkylatable hydrocarbon containing polymer forming contaminants selected from the group consisting of diolefins, acetylene, acetylene homologs and mixtures thereof, which comprises contacting said hydrocarbon with a metal pyrophosphate catalyst in a polymerization zone under conditions selective for polymerizing of said contaminants, separating product from said polymerization zone and passing the same to a distillation zone to recover undesirable polymer contaminants from the lower portion thereof, purified alkylatable hydrocarbons from the upper portion thereof, and an intermediate fraction free of undesirable polymer contaminants, cooling said intermediate fraction, passing said cooled fraction to said polymerization zone to control the temperature thereof within the desired limits and passing said purified alkylatable hydrocarbon to an alkylation process.

5. A method for purifying a light hydrocarbon containing contaminants selected from the group consisting of diolefins, acetylene, acetylene homologs and mixtures thereof, which comprises selectively polymerizing said contaminants in a polymerization zone in the presence of a solid polymerization catalyst, separating product from said polymerization zone into a purified alkylatable hydrocarbon fraction, an intermediate fraction free of polymer, and a fraction containing undesirable polymer contaminants, recycling a cooled intermediate fraction to said polymerization zone to control the temperature thereof within the range of from about 200° F. to about 450° F. and alkylating said purified alkylatable hydrocarbon fraction in an alkylation process.

References Cited in the file of this patent

UNITED STATES PATENTS

| | | |
|---|---|---|
| 2,355,392 | Oberfell | Aug. 8, 1944 |
| 2,399,240 | McAllister et al. | Aug. 30, 1946 |
| 2,413,254 | Soday | Dec. 24, 1946 |
| 2,414,206 | Layng | Jan. 14, 1947 |
| 2,438,444 | Jones et al. | Mar. 23, 1948 |
| 2,555,940 | Simms | June 5, 1951 |
| 2,618,614 | Bielawski et al. | Nov. 18, 1952 |